US010122702B2

(12) United States Patent
Jayakumar et al.

(10) Patent No.: US 10,122,702 B2
(45) Date of Patent: *Nov. 6, 2018

(54) SINGLE SIGN-ON FOR INTERCONNECTED COMPUTER SYSTEMS

(71) Applicant: Bank of America Corporation, Charlotte, NC (US)

(72) Inventors: Hemanth Grama Jayakumar, Plainsboro, NJ (US); Manoj Kumar Chava, East Windsor, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,551

(22) Filed: Feb. 22, 2018

(65) Prior Publication Data

US 2018/0183782 A1 Jun. 28, 2018

Related U.S. Application Data

(63) Continuation of application No. 14/804,967, filed on Jul. 21, 2015, now Pat. No. 9,961,068.

(51) Int. Cl.
*G06F 7/04* (2006.01)
*H04L 29/06* (2006.01)

(52) U.S. Cl.
CPC ........ *H04L 63/0815* (2013.01); *H04L 63/083* (2013.01); *H04L 63/0807* (2013.01); *H04L 63/102* (2013.01)

(58) Field of Classification Search
CPC ............ G06F 21/10; G09G 2340/0407; G09G 2358/00; G09G 2370/047; G09G 2370/12; G09G 5/006; H04L 63/0428; H04N 21/2347; H04N 21/43622; H04N 21/4367; H04N 21/440263; H04N 21/4408; H04N 21/4325
See application file for complete search history.

(56) References Cited

U.S. PATENT DOCUMENTS

| 8,645,399 | B2 | 2/2014 | McNeill et al. |
| 8,873,836 | B1 | 10/2014 | Dietrich et al. |
| 8,949,175 | B2 | 2/2015 | Wu et al. |
| 9,031,925 | B2 | 5/2015 | Gardella et al. |

(Continued)

*Primary Examiner* — Abiy Getachew
(74) *Attorney, Agent, or Firm* — Banner & Witcoff, Ltd.; Michael A. Springs

(57) ABSTRACT

Methods, systems, and computer-readable media support provisioning a computer application that is executed on an associated computing component through a primary computing component. Even though different passwords may be associated with a user for the primary and the associated computing components, one aspect is seamless single sign-on to a computer cluster that provides the external computer application so that any user or group membership changes at the primary computing component is transparent to the associated computing component. Users may be restricted service for the application at the edge nodes of the cluster and are then able to access data in directories corresponding to the user's group as configured at the primary computing component. A batch process may be initiated to issue a security token to one more users, thus enabling the user to obtain a service ticket and consequently service for the application.

16 Claims, 15 Drawing Sheets

(56) References Cited

U.S. PATENT DOCUMENTS

| | | |
|---|---|---|
| 2009/0025089 A1* | 1/2009 | Martin .................... G06F 21/31 726/28 |
| 2010/0306286 A1 | 12/2010 | Chiu et al. |
| 2010/0306833 A1* | 12/2010 | Bank .................... G06F 21/31 726/5 |
| 2012/0182891 A1 | 7/2012 | Lee et al. |
| 2013/0173560 A1 | 7/2013 | McNeill et al. |
| 2013/0204948 A1 | 8/2013 | Zeyliger et al. |
| 2013/0275363 A1 | 10/2013 | Wu et al. |
| 2013/0282650 A1 | 10/2013 | Zhang et al. |
| 2013/0282668 A1 | 10/2013 | Hsieh |
| 2014/0040575 A1 | 2/2014 | Horn |
| 2014/0047422 A1 | 2/2014 | Ravi et al. |
| 2014/0059310 A1 | 2/2014 | Du et al. |
| 2014/0137104 A1 | 5/2014 | Nelson et al. |
| 2014/0172809 A1 | 6/2014 | Gardella et al. |
| 2014/0173618 A1 | 6/2014 | Neuman et al. |
| 2014/0181176 A1 | 6/2014 | Swamy et al. |
| 2014/0236977 A1 | 8/2014 | Deutsch et al. |
| 2014/0236990 A1 | 8/2014 | Deutsch et al. |
| 2014/0237017 A1 | 8/2014 | Adkar et al. |
| 2014/0245298 A1 | 8/2014 | Zhou et al. |
| 2014/0280032 A1 | 9/2014 | Komacker et al. |
| 2014/0344310 A1 | 11/2014 | Seetharaman et al. |
| 2014/0344778 A1 | 11/2014 | Lau et al. |
| 2014/0358977 A1 | 12/2014 | Cramer et al. |
| 2015/0026462 A1 | 1/2015 | Ramesh et al. |
| 2015/0032759 A1 | 1/2015 | Lee et al. |
| 2015/0039667 A1 | 2/2015 | Shah et al. |
| 2015/0058843 A1 | 2/2015 | Holler et al. |
| 2015/0066646 A1 | 3/2015 | Sriharsha et al. |
| 2015/0067410 A1 | 3/2015 | Kumar et al. |
| 2015/0074216 A1 | 3/2015 | Park |
| 2015/0089415 A1 | 3/2015 | Lee et al. |
| 2015/0089521 A1 | 3/2015 | Orlowski |
| 2015/0095308 A1 | 4/2015 | Kornacker et al. |
| 2015/0120695 A1 | 4/2015 | Vasu et al. |
| 2015/0120791 A1 | 4/2015 | Gummaraju et al. |
| 2015/0120928 A1 | 4/2015 | Gummaraju et al. |
| 2015/0121371 A1 | 4/2015 | Gummaraju et al. |
| 2015/0125133 A1 | 5/2015 | Kim et al. |
| 2015/0160884 A1 | 6/2015 | Scales et al. |

* cited by examiner

SINGLE SIGN-ON FOR INTERCONNECTED COMPUTER SYSTEMS

PRIORITY

This application is a continuation of U.S. patent application Ser. No. 14/804,967 entitled "Single Sign-On for Interconnected Computer Systems" and filed on Jul. 21, 2015 which is incorporated by reference herein in its entirety.

FIELD

Aspects described herein relate to a single sign-on for interconnected computer components, in which one of the computer components supports an application.

BACKGROUND

A user often access different separate computer systems in order to obtain resources and services that are not available on the user's primary computing component. The different computer systems may be separately administered; however, it is advantageous that the user access the systems in some seamless fashion. One traditional approach (referred as federated identity (FID)) stores a user's credentials with an identity provider. When the user logs into a service on a service provider's computer system, the service provider trusts the identity provider to validate the credentials. Consequently, the user never provides credentials directly to anybody but the identity provider.

With another traditional approach, a user obtains a ticket-granting ticket (TGT) through an initial sign-on. Additional software applications may use the TGT to acquire service tickets to prove the user's identity to the software applications without prompting the user to re-enter the user's credentials.

Consequently, it is beneficial to enhance seamless operation for a user across separate computer systems.

SUMMARY

Aspects of the disclosure relate to a seamless single sign-on for a computer cluster so that user or group membership changes on a primary computing component are transparent to an application supported by the computer cluster. The application may be accessed by provisioned users only from a subset of nodes of a cluster (e.g., edge nodes), where the accessed data is in accordance with the user's application group.

In some embodiments, a computer application on an associated computing component is provisioned through a primary computing component, where the associated computing component supports an application. First and second passwords are maintained on the primary and associated computing components, respectively. According to one aspect, the user is required to enter the first password through the primary computing component in order to obtain service provided on the associated computing component.

In some embodiments, provisioning of a user or group for an application supported by an associated computing component is performed through a primary computing component. Membership changes in the service group associated with the application are transparent to the operation of the application on the associated computing component.

In some embodiments, an application is distributed over a plurality of computing nodes (node cluster) in an associated computing component, which is connected to a primary computing component via a computer communication network. The associated computing component may restrict interactive users to login for access to an application only through an edge node of the cluster. Users on the edge node are then able to access data in directories corresponding to the user's service group that is maintained at the primary computing component. However, with some embodiments, the user may be restricted on a different subset of the nodes in the cluster.

In some embodiments, a computing system includes a primary computing component and at least one associated computing component, where each associated computing component may support one or more applications and each associated computing component has different passwords for a given user. The primary computing component may provision a user for a requested service supported by the corresponding application and interact with the appropriate associated computing component that supports the corresponding application.

In some embodiments, an associated computing component is change agnostic in that any user or group membership changes in the primary identity manager of the primary computing component is transparent to the associated computing component.

In some embodiments, a user presents credentials to the primary computing component only. The associated computing component is systematically invoked and the corresponding security token is issued. Consequently, the user interacts with the primary computing component for credentials so that the associated computing component is transparent to the user.

In some embodiments, a batch process that is performed at an associated computing component is triggered in accordance with some predetermined event such as the time of day. The batch process initiates granting service supported by the associated computing component for one or more users and authenticates the primary user identification with the primary computing component for the service. The batch process subsequently extracts the user identification and the secondary password, which is assigned to a user at the associated computing component from the user profile and authenticates the extracted secondary password with the secondary identification manager of the associated computing component. If the extracted secondary password is authenticated, the secondary identification manager issues a security token to the user for the first application. When a user requests service for the first application, the secondary identification manager interrogates the security token, and if successful, the secondary identification manager issues a service ticket to the user for the service. The user may then present the service ticket to one or more computing nodes of the associated computing component that is accessible to the user in order to obtain the service.

In some embodiments, a user can interactively request a service from an associated computing component via a primary computing component by presenting a user identification and primary password of the user as maintained by the primary computing component. Consequently, the user interacts with the primary computing component for credentials, where the associated computing component is transparent to the user. The associated computing component receives a service request via the primary computing component and subsequently authenticates the primary user identification with the primary computing component for the application. If the primary user identification is successfully authenticated, the associated computing component extracts the secondary password and primary user identification from the user profile and authenticates the extracted secondary password with the secondary identification manager at the associated computing component. If the extracted secondary password is authenticated, the secondary identification manager issues a security token to the user for the application.

In some embodiments, an associated computing component may execute script by at least one processor when the script is initiated by the primary computing component. When the associated computing component receives an initiation from a primary computing component to provision a group for an application, a secondary identity manager at the associated computing component generates a secondary password for the user with the primary user identification, where the secondary password is typically different from the primary password and may be encrypted. A user profile is then created for the user with the primary user identification and the secondary password.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
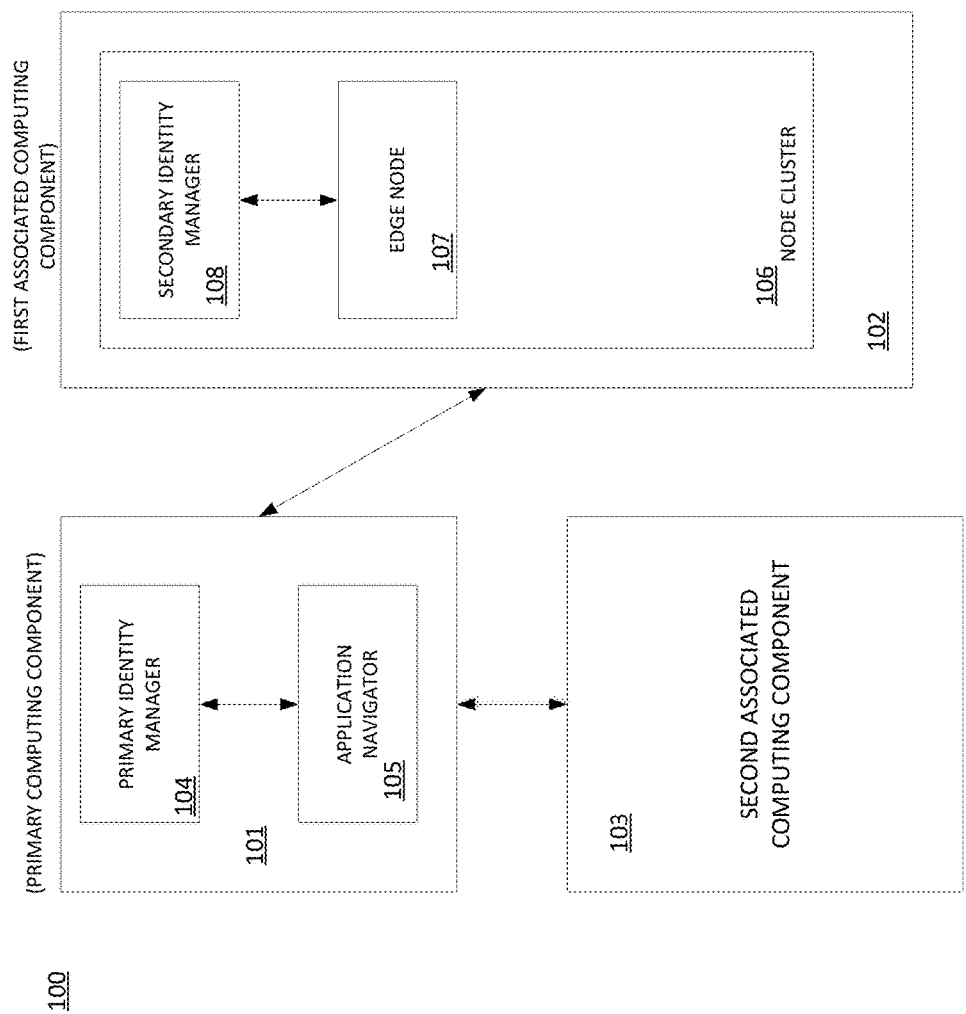
FIG. 1 depicts a computing system having a primary computing component and one or more associated computing components in accordance with one or more example embodiments.
Figure 2:
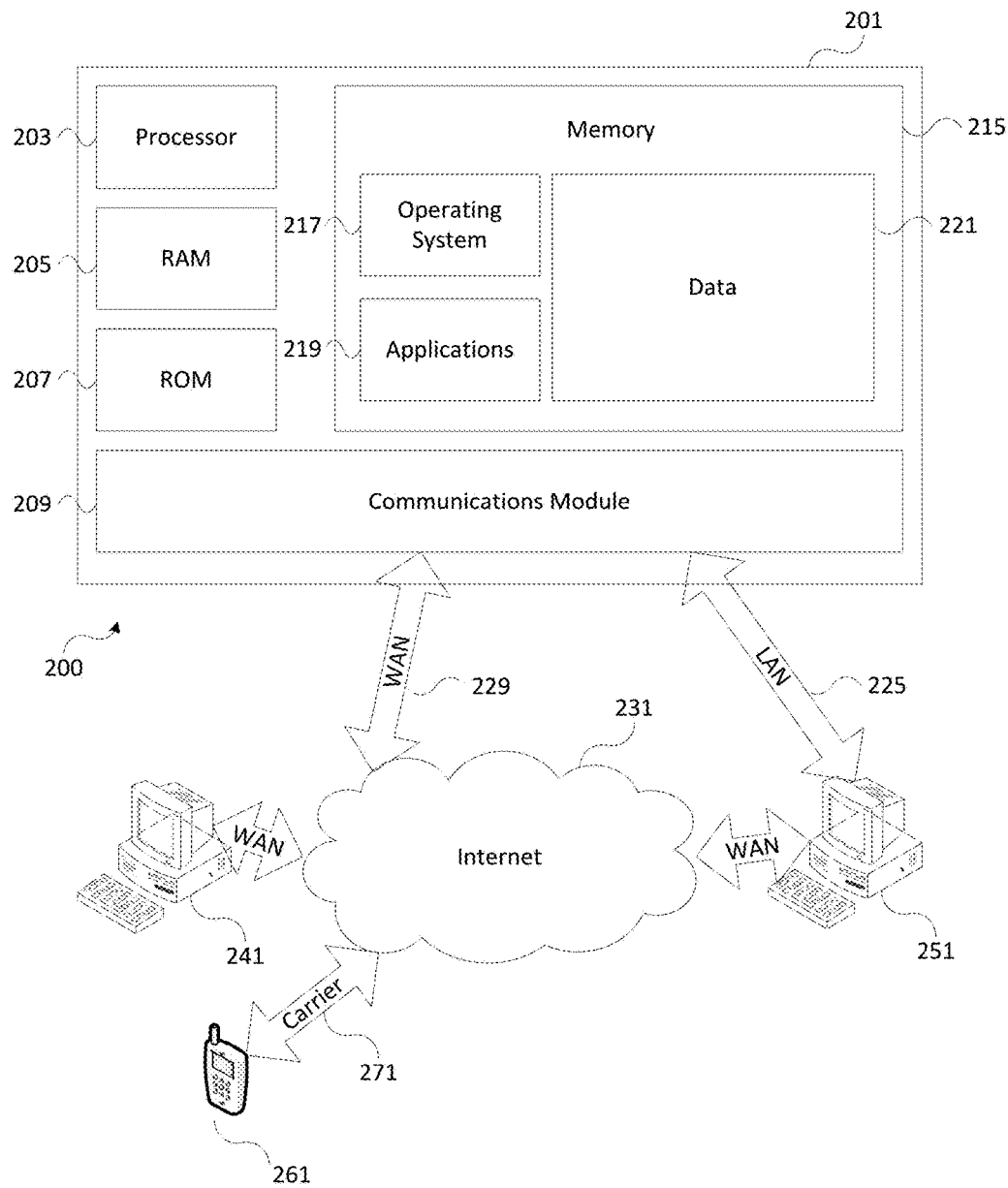
FIG. 2 depicts an illustrative operating environment in which various aspects of the disclosure may be implemented in accordance with one or more example embodiments.

FIG. 1 depicts system 100 comprising primary computing component 101 and one or more associated computing components 102, 103 in accordance with one or more example embodiments. With some embodiments, components 101, 102, and/or 103 may be implemented on separate physical computer platforms, where each platform comprises one or more computing devices 201 as shown in FIG. 2. Moreover, the functionality of some of the components, e.g., associated computing component 102, may be provided by a cloud service on a computing platform that supports one or more applications for one or more business entities by a third party. Alternatively, with some embodiments, a computing component may be implemented as a logical module that executes on the same physical computer platform as another computing component, where the logical module comprises one or more software modules.

With some embodiments, primary computing component 101 may serve as the main computer system for a business entity while interconnected with associated computing components 102, 103, which support applications that may be provisioned and provide services to users via primary computing component 101. For example, associated computing component 102 may support an application in which a distributed file system is distributed over node cluster 106, which contains a plurality of computing nodes including edge node 107. (For example, edge node 107 may be an interface between cluster 106 and the outside network. For this reason, edge node 107 may be referred to as a gateway node and may be used to run applications and cluster administration tools.) Moreover, with some embodiments each computing node may comprise one or more computing devices 201 as shown in FIG. 2. However, with some embodiments, any of the nodes in cluster 106 may be supported on the same computing device 201. A user may access the distributed file system (not explicitly shown in FIG. 1) to store data (which may be huge in size and may be structured or unstructured) about the business entity and to process the data in a distributed manner.

System 100 provides a seamless single sign-on to edge cluster 106 when access service provided by an application supported by associated computing component 102. With some embodiments, the single sign-on may be referred to a federated single sign-on, where computing and/or network providers agree upon standards of operation in a collective fashion. The term "federation" may be used when describing the inter-operation of two distinct, formally disconnected, telecommunications networks that may have different internal structures. User or group membership changes that occur at primary identity manager 104 may be transparent to the operation of associated computing component 102 and seamless to a user. As will be discussed in greater detail, users accessing edge node 107 are then able to access data in directories corresponding to the user's group configured at primary identity manager 104. Moreover, system 100 may restrict access to other nodes in cluster 106 only to administrators and other authorized personnel of system 100.

While primary computing component 101 and associated computing components 102, 103 may be configured with different passwords for a user, the differences of passwords are transparent to the user. (As will be discussed later, a random password is generated for the user by secondary identity manager 108 while accessing system 100 through primary computing component 101.) For example, the user only needs to provide the password configured at primary computing component 101 (referred as the primary password) in order to access services supported by applications at associated computing components 102,103.

System 100 may support a plurality of applications at associated computing components 102, 103. A user or an administrator on behalf of the user may request service a specific application through application navigator 105. If approved, a group is created or the user is added to a previously created group associated with the specific application at primary identity manager 104. Furthermore, as will be further discussed, the user is provisioned at the associated computing component 102 or 103 that supports the specific application.

With some embodiments, associated computing component 102 or 103 will issue a security token to the user when the requested service has been successfully provisioned on the external system. The user can subsequently present the security token to the associated computing component to obtain a service ticket, enabling the user to access the application for a specified time as specified by the security ticket. The user may then obtain service from the associated computing component by presenting the service ticket.

FIG. 2 depicts an illustrative operating environment in which various aspects of the present disclosure may be implemented in accordance with one or more example embodiments. Referring to FIG. 2, computing system environment 200 may be used according to one or more illustrative embodiments. Computing system environment 200 is only one example of a suitable computing environment and is not intended to suggest any limitation as to the scope of use or functionality contained in the disclosure. Computing system environment 200 should not be interpreted as having any dependency or requirement relating to any one or combination of components shown in illustrative computing system environment 200.

Computing system environment 200 may include computing device 201 having processor 203 for controlling overall operation of computing device 201 and its associated components, including random-access memory (RAM) 205, read-only memory (ROM) 207, communications module 209, and memory 215. Computing device 201 may include a variety of computer readable media. Computer readable media may be any available media that may be accessed by computing device 201, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 201.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 201. Such a processor may execute computer-executable instructions stored on a computer-readable medium.

Software may be stored within memory 215 and/or storage to provide instructions to processor 203 for enabling computing device 201 to perform various functions. For example, memory 215 may store software used by computing device 201, such as operating system 217, application programs 219, and associated database 221. Also, some or all of the computer executable instructions for computing device 201 may be embodied in hardware or firmware. Although not shown, RAM 205 may include one or more applications representing the application data stored in RAM 205 while computing device 201 is on and corresponding software applications (e.g., software tasks) are running on computing device 201.

Communications module 209 may include a microphone, keypad, touch screen, and/or stylus through which a user of computing device 201 may provide input, and may also include one or more of a speaker for providing audio output and a video display device for providing textual, audiovisual and/or graphical output. Computing system environment 200 may also include optical scanners (not explicitly shown). Exemplary usages include scanning and converting paper documents, e.g., correspondence, receipts, and the like, to digital files.

Computing device 201 may operate in a networked environment supporting connections to one or more remote computing devices, such as computing devices 241, 251, and 261. Computing devices 241, 251, and 261 may be personal computing devices or servers that include any or all of the elements described above relative to computing device 201. Computing device 261 may be a mobile device (e.g., smart phone) communicating over wireless carrier channel 271.

The network connections depicted in FIG. 2 may include local area network (LAN) 225 and wide area network (WAN) 229, as well as other networks. When used in a LAN networking environment, computing device 201 may be connected to LAN 225 through a network interface or adapter in communications module 209. When used in a WAN networking environment, computing device 201 may include a modem in communications module 209 or other means for establishing communications over WAN 229, such as Internet 231 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Referring to FIG. 1, primary computing component 101 and/or associated computing components 102,103 may comprise one or more processors 201.

Figure 3:
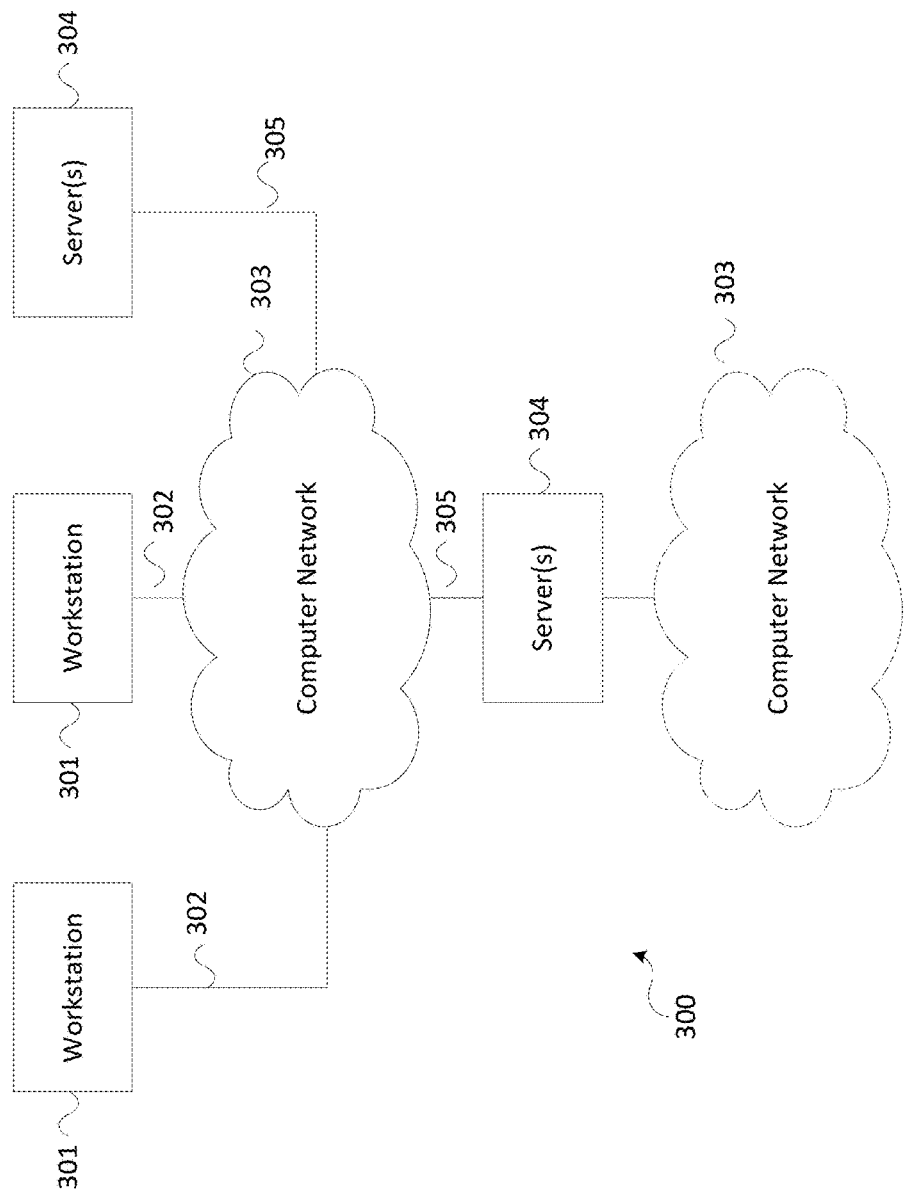
FIG. 3 depicts an illustrative block diagram of workstations and servers that may be used to implement the processes and functions of certain aspects of the present disclosure in accordance with one or more example embodiments.

FIG. 3 depicts an illustrative block diagram of workstations and servers that may be used to implement the processes and functions of certain aspects of the present disclosure in accordance with one or more example embodiments. Referring to FIG. 3, illustrative system 300 may be used for implementing example embodiments according to the present disclosure. As illustrated, system 300 may include one or more workstation computers 301. Workstation 301 may be, for example, a desktop computer, a smartphone, a wireless device, a tablet computer, a laptop computer, and the like. Workstations 301 may be local or remote, and may be connected by one of communications links 302 to computer network 303 that is linked via communications link 305 to server 304. In system 300, server 304 may be any suitable server, processor, computer, or data processing device, or combination of the same. Server 304 may be used to process the instructions received from, and the transactions entered into by, one or more participants.

Computer network 303 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 302 and 305 may be any communications links suitable for communicating between workstations 301 and server 304, such as network links, dial-up links, wireless links, hard-wired links, as well as network types developed in the future, and the like.

Referring to FIG. 1, primary computing component 101 and/or associated computing component 102 may comprise one or more servers 304. A user can interact with servers 304 through workstation 301.

Figure 4:
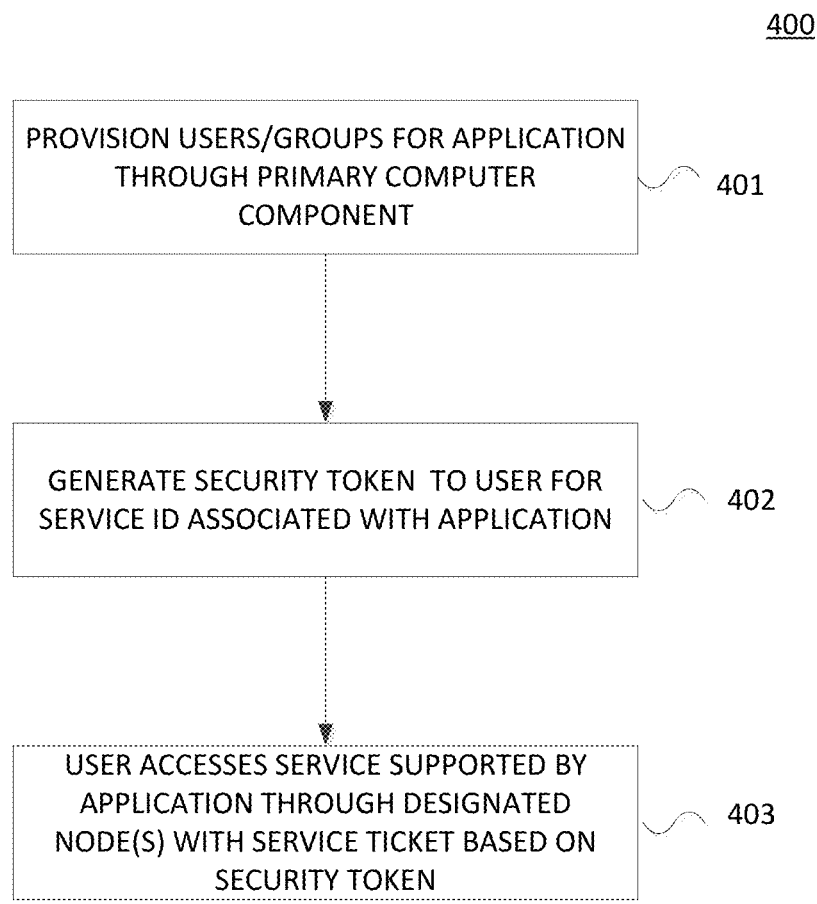
FIG. 4 shows a flowchart for provisioning and enabling a user to obtain service by an application on an associated computing component in accordance with one or more example embodiments.

FIG. 4 shows flowchart 400 for provisioning and enabling a user for obtaining service by an application on an associated computing component in accordance with one or more example embodiments.

At block 401, users/groups are provisioned for a selected application through primary computing component 101. As will be discussed, the provisioning of users for a selected application that is supported by associated computing component 102 is initiated from primary computing component 101. The provisioning process, as further discussed with a provisioning scenario shown in FIG. 5, spans both primary computing component 101 and associated computing component 102.

Figure 6:
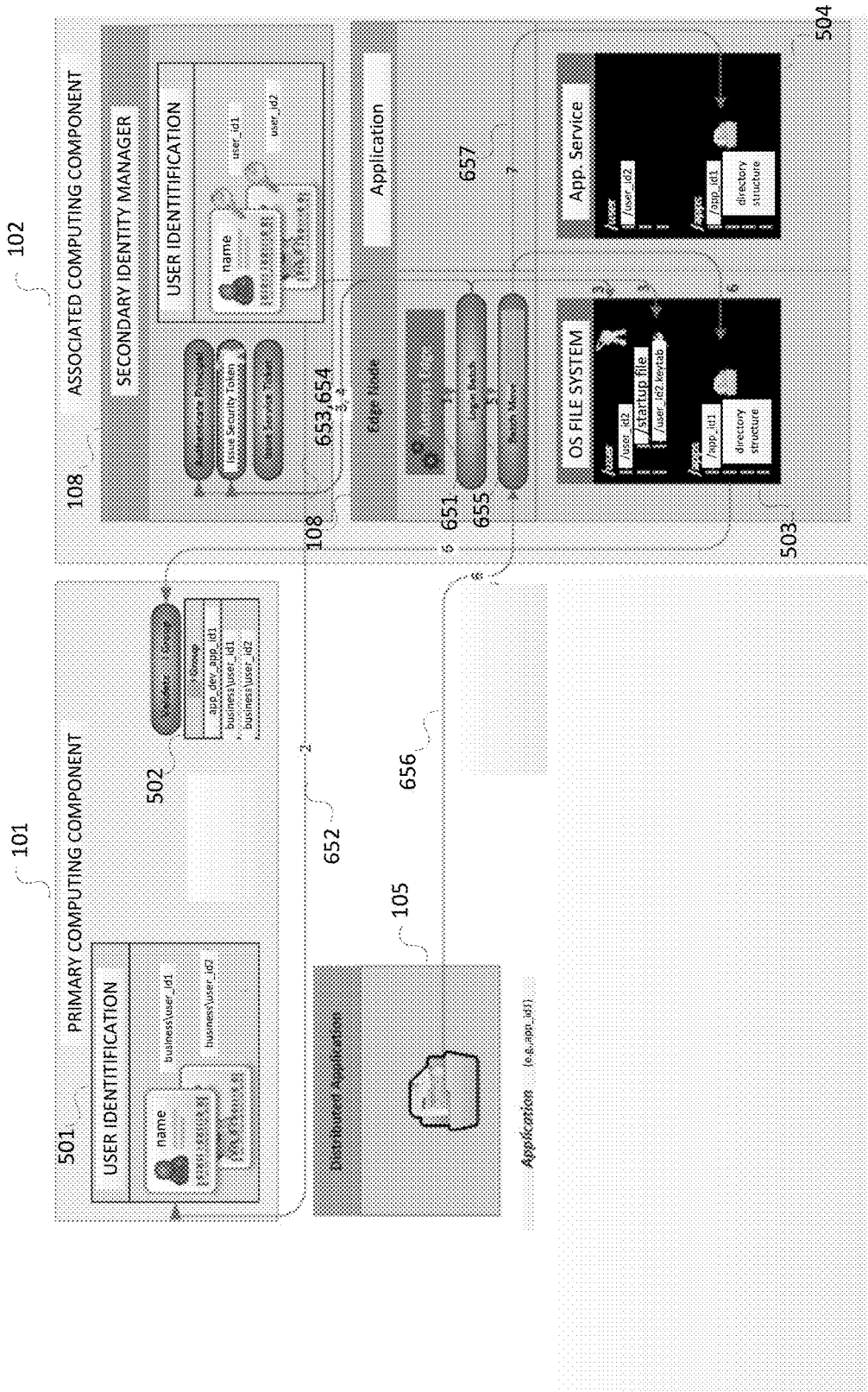
FIG. 6 depicts an illustrative computing environment for batch process for enabling a user to obtain service by an application on an associated computing component in accordance with one or more example embodiments.

At block 402, as further discussed in FIG. 6, a security token for a service id associated with the selected application is issued to the provisioned users. At block 403, the user may be issued a service ticket to access the application from the associated computing component when the service ticket is valid.

Figure 5:
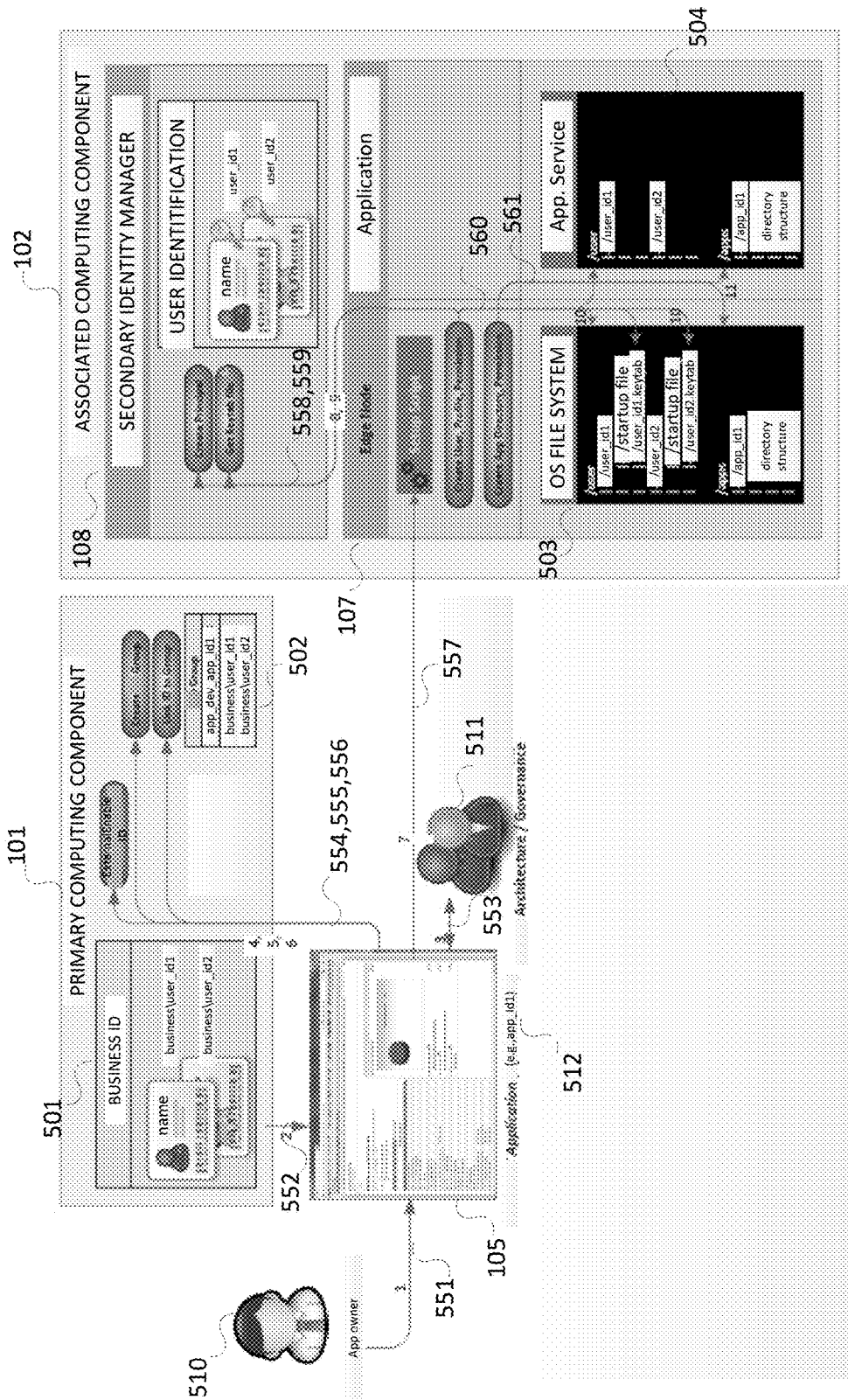
FIG. 5 depicts an illustrative computing environment for provisioning a group or user for service provided by an application on an associated computing component in accordance with one or more example embodiments.

FIG. 5 depicts an illustrative computing environment for provisioning a group or user for service provided by an application on an associated computing component in accordance with one or more example embodiments. FIG. 6 depicts an illustrative computing environment for a batch process that enables a user to obtain service by an application executing on an associated computing component in accordance with one or more example embodiments.

The environments shown in FIGS. 5 and 6 include primary computing component 101 and associated computing component 102 as previously discussed with FIG. 1. Primary computing component 101 includes directories 501 and 502 (which may be supported by primary identity manager 104 as shown in FIG. 1) and application navigator 105. Associated computing component 102 includes secondary identity manager 108 and edge computing node 107, which supports operating system (OS) file system 503 and application service 504. With some embodiments, application service 504 is supported by an application as selected through application navigator 105 (designated as selection 512 with a value "app_id1" as shown in FIG. 5).

Referring to the scenario shown in FIG. 5, application owner 510 initiates a request to provision an application at step 551. Application owner 510 navigates application navigator 105 to the selected application (corresponding to a value "app_id1" as shown on the exemplary screenshot) at step 552. Application owner 510 looks up information for designated users in directory 501 and adds/submits an environment request. At step 553, the request is reviewed by governance entity 511, where the remainder of the scenario assumes that the request is approved. However, with some embodiments, the step 553 may be performed in an autonomous fashion by primary computing component 101 by matching characteristics of the request with predetermined criteria.

At step 554, user identifications (designated as the primary user identification) for the designated users are submitted to initiate the provisioning the designated users. A corresponding group is then created for the selected application at step 555. At step 556, the designated user identifications are added to the application group (e.g., user_id1 and user_id2 are added to app_dev_app_id1 as shown in FIG. 5).

With the above steps completing the configuration for the application at primary identification manager 104, execution of setup script is initiated at step 557. The set-up script is executed at associated computing component 102 to perform steps 558-511. As will be further discussed, FIGS. 12-15 show steps that are performed when executing the script.

At step 558, secondary identity manager 108 creates an entry with the same primary user identification as configured at primary identity manager 104. (In other words, the user identification is the same at primary computing component 101 and associated computing component 102.) A corresponding secondary password is also generated for each user identification and is typically different from the primary password that is configured at primary computing component 101. For example, the secondary password may be randomly generated from specified algorithm. With some embodiments, the secondary password is encrypted to enhance security but in a transparent fashion to the user. For example, while the user may be required to submit the primary password to primary computing component 101, the user may not be required to have knowledge of the secondary password since primary computing component 101 interacts with associated computing component 102. At step 559, the user's encrypted keytab file is extracted with the random password, where the keytab file comprises the encrypted secondary password.

With some embodiments, different applications may be supported by one or more associated computing components. If a user is configured with a plurality of applications, the user may have different passwords for the different applications.

At step 560, the user profile and application directory structures 503 and 504 are created, the keytab file is moved, and the startup file is updated.

At step 561, application directory 504 is created with group level access. For example, with some embodiments, no user level access is provided and members of the group have read/write permissions to their app folder while non-members may have read-only access to some of the files in the app folder. With the completion of step 561, users can have single sign-on using the primary user identification (as configured at directory 501) into edge node 107. However, some embodiments may able a user to access a service through different subsets of the node cluster other than at edge node 107. Embodiments may also enable services for users either as a batch mode as discussed in FIG. 6 or with an interactive mode.

FIG. 6 depicts an illustrative computing environment for batch process for enabling a user to obtain service by an application on an associated computing component in accordance with one or more example embodiments. At step 651, the batch process is triggered based on some event such as a predetermined time/date.

At step 652, secondary identity manager 108 authenticates user identifications for the service id against directory 501 that is located primary computing component 101. If successful, user information (e.g., keytab file) in the user's profile 503 is authenticated against the user information stored in secondary identity manager 108 at step 653. With some embodiments, authentication may be re-attempted or diverted to help facilities if the previous authentication is unsuccessful.

At step 654, secondary identity manager 108 issues a security token to each of the authenticated users for the service id. For example, the security token is sent to the user's client machine via primary computing component 101. Subsequently, the batch move corresponding to the service associated with the application is invoked at step 655. Consequently, the batch move transfers file permission information from application navigator 105 to directory 503 at edge node 108 at step 656. Write permissions are then validated with directory 502, which located at primary computing component 101.

At step 657, the authenticated user may request a service ticket from secondary identification manager 108 by presenting the user's security token. Secondary identification manager 108 then interrogates the security token and issues a service ticket to the user if the interrogation is successful. Selected files at directory 503 may then be moved to directory 504. The user can subsequently request the service provided by the application by presenting the service ticket while the service ticket is valid.

Figure 7:
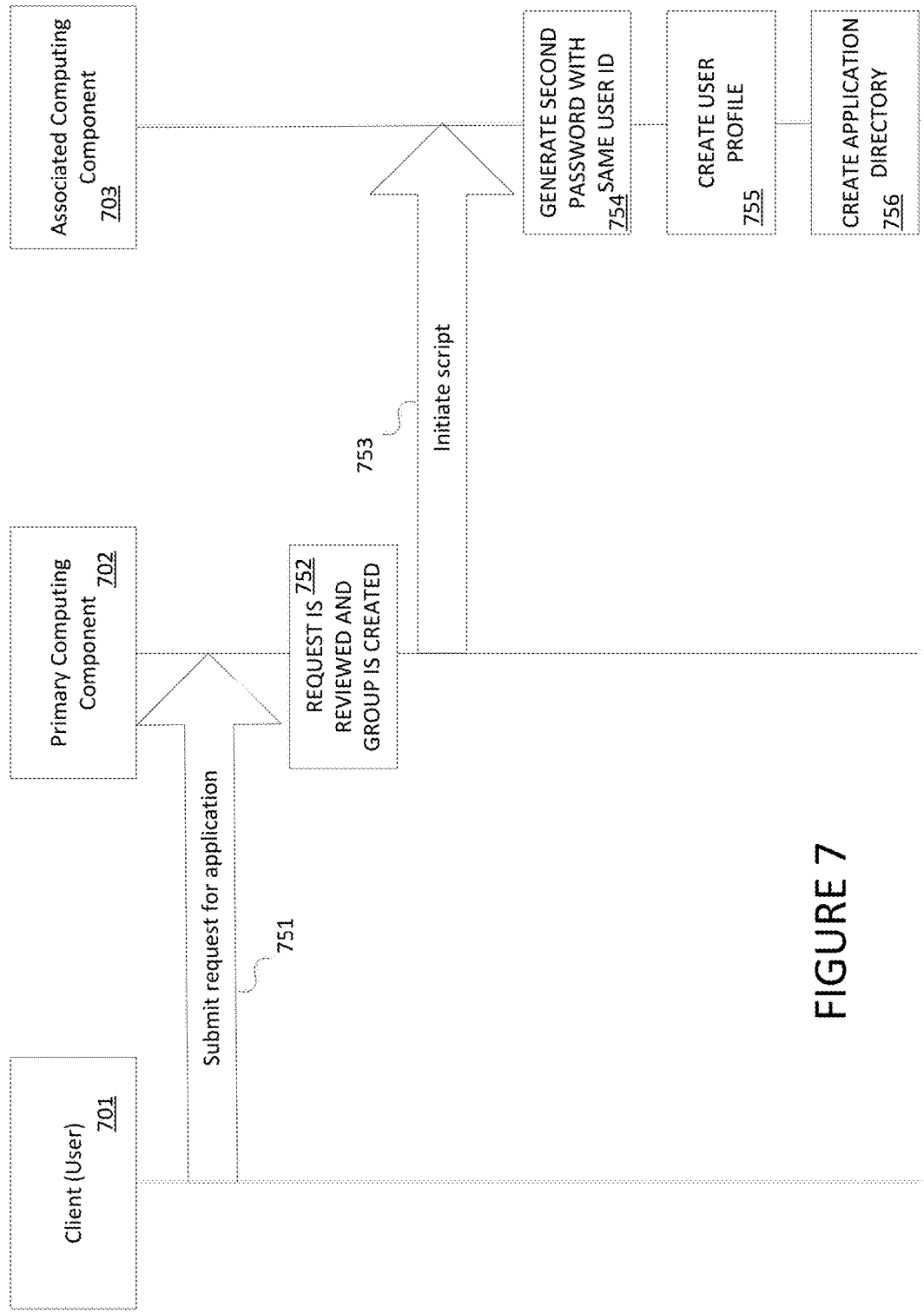
FIG. 7 depicts an illustrative event sequence for provisioning a group or user for service provided by an application on an associated computing component in accordance with one or more example embodiments.

FIG. 7 depicts an illustrative event sequence for provisioning a group or user for service provided by an application on an associated computing component in accordance with one or more example embodiments. The event sequence parallels the scenario shown in FIG. 5 where a group or user for service provided by associated computing component 102 is provisioned through primary computing component 101. Referring to FIG. 7, client computer 701 submits request 751 to primary computing component 702 for service by an application supported by associated computing component 703.

Request 751 is reviewed at event 752, and, if approved, primary computing component 702 initiates execution of script at associated computing component 703 with initiation 752 to provision the service for the user/group. Events 754, 755, and 756 (corresponding to steps 559-561 as shown in FIG. 5) is performed by executing the script to complete the provisioning at associated computing component 703.

Figure 8:
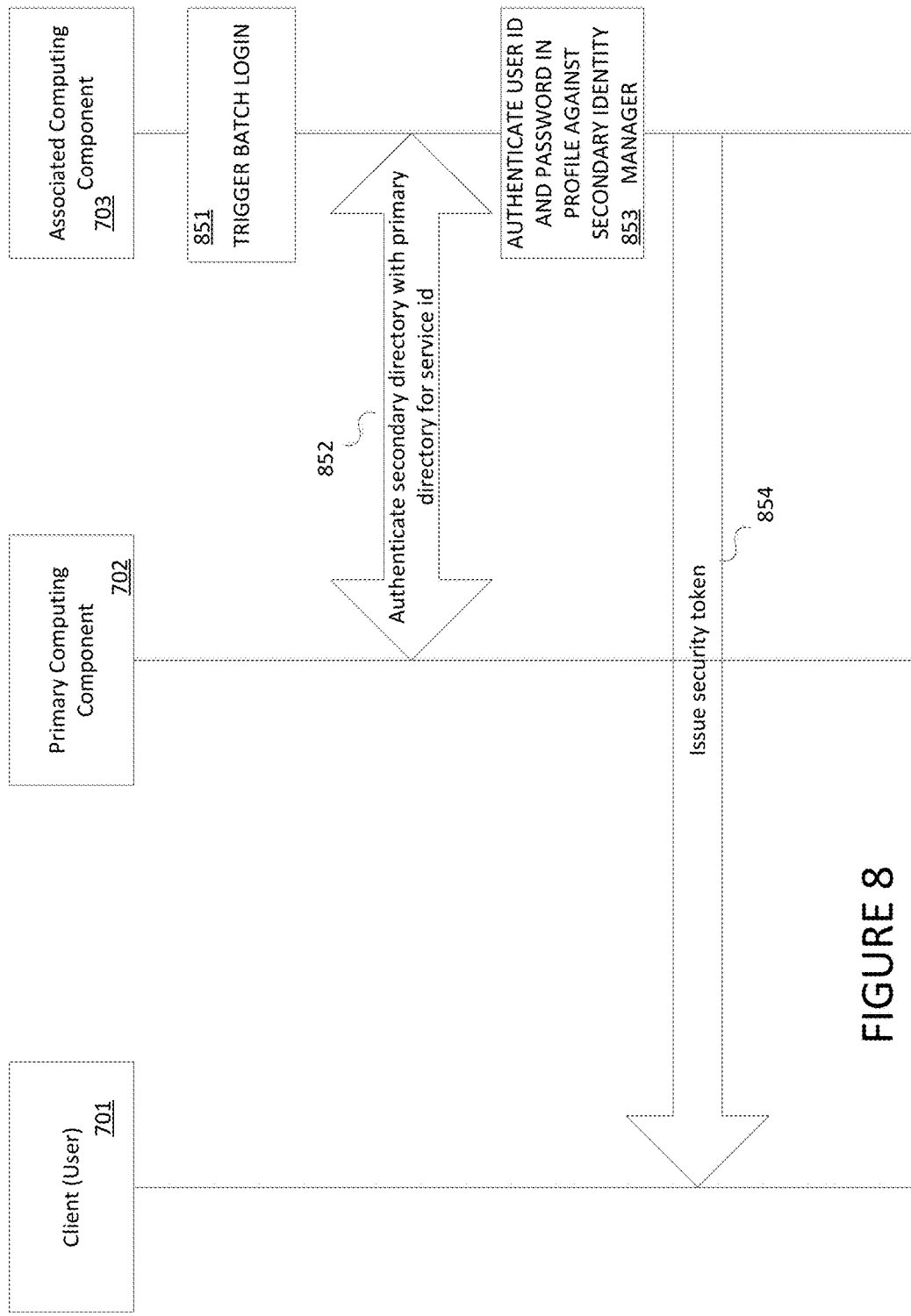
FIG. 8 depicts an illustrative event sequence for obtaining a security token for service by an application on an associated computing component in accordance with one or more example embodiments.

FIG. 8 depicts an illustrative event sequence for obtaining a security token for service by an application on an associated computing component in accordance with one or more example embodiments. The event sequence parallels a portion of the scenario shown in FIG. 6 where events 851-854 correspond to steps 651-654.

Referring to FIG. 8, the batch process at associated computing component 703 is triggered at event 851 based on a predefined time. Consequently, at event 852 the secondary directory at associated computing component 703 is authenticated with primary computing component 702 for the service id.

At event 853 the user identification and password in the user profile is authenticated with the secondary identity manager at associated computing component 703. If the user is successfully authenticated, a security token is issued to the user at event 854.

Figure 9:
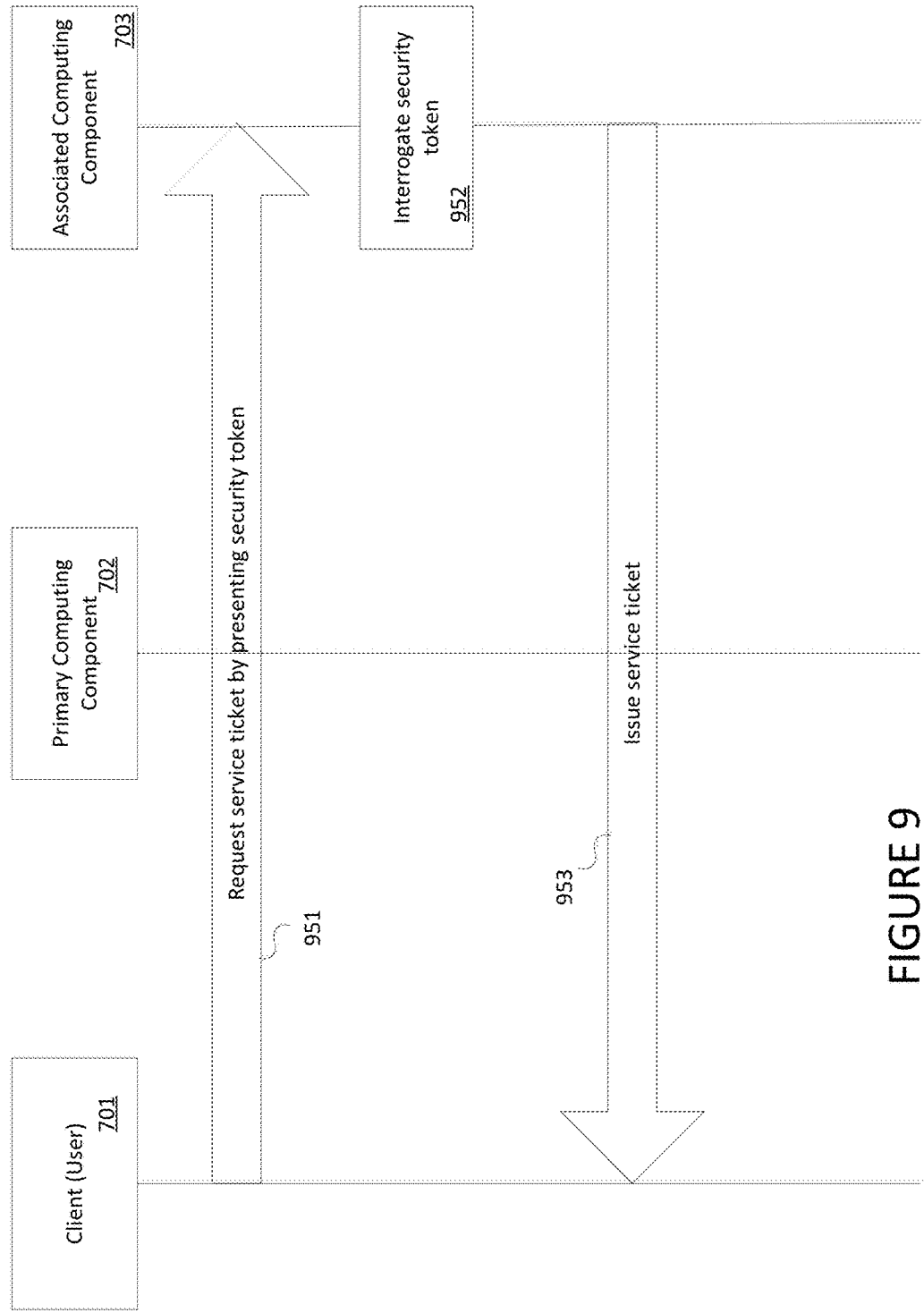
FIG. 9 depicts an illustrative event sequence for obtaining a service ticket for service by an application on an associated computing component in accordance with one or more example embodiments.

FIG. 9 depicts an illustrative event sequence for obtaining a service ticket for service by an application on associated computing component 703 in accordance with one or more example embodiments. The event sequence parallels a portion of the scenario shown in FIG. 6 where events 951-953 correspond to step 657.

At event 951, a user requests a service ticket from associated computing component 703 by presenting the user's security token for the service id. Associated computing component 703 interrogates the security token at event 952 and issues a service ticket at event 953 to the user if the interrogation is successful.

Figure 10:
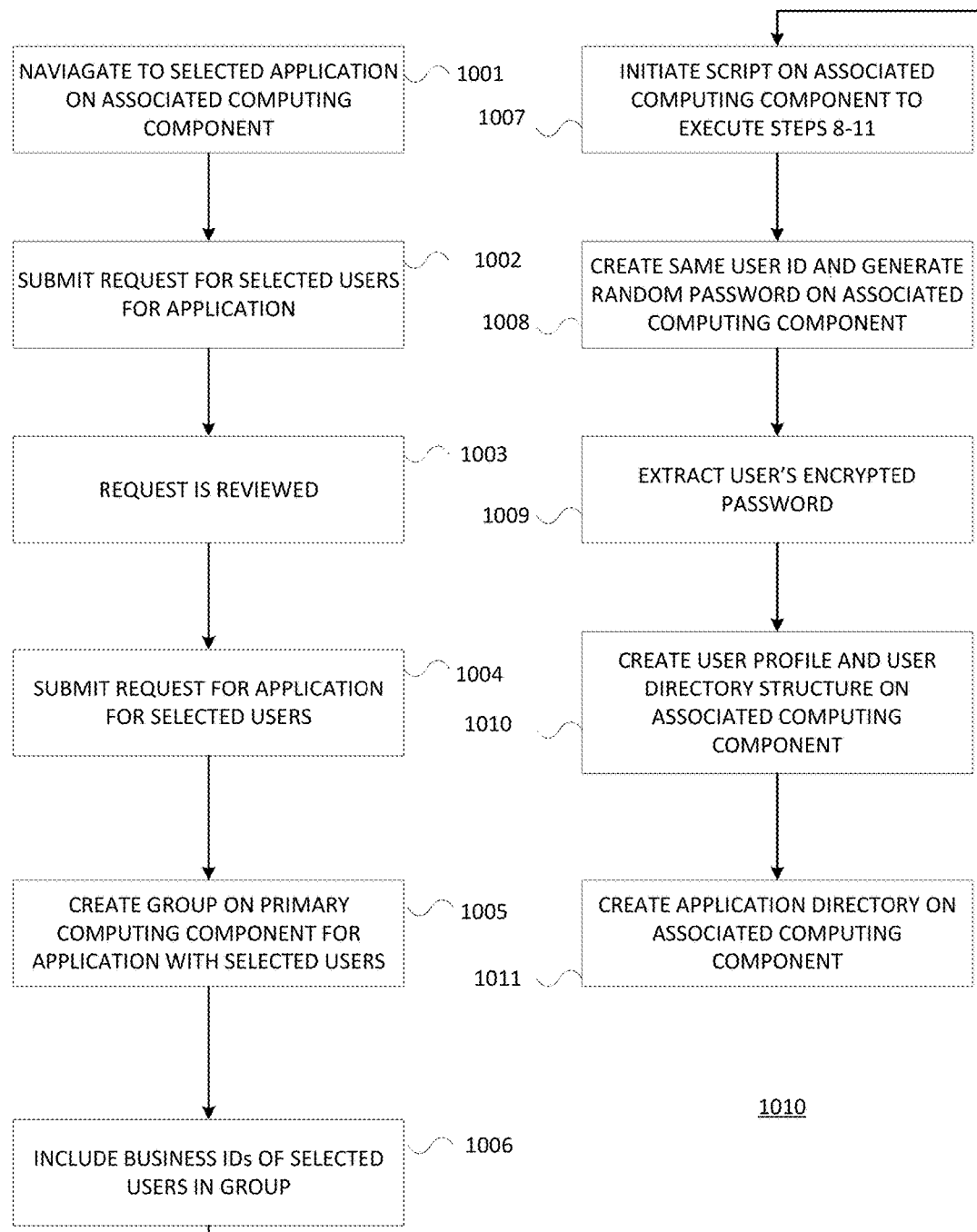
FIG. 10 shows a flowchart for provisioning a group or user for obtaining service by an application on an associated computing component in accordance with one or more example embodiments.

FIG. 10 shows flowchart 1000 for provisioning a group or user for obtaining service by an application on an associated computing component in accordance with one or more example embodiments. A computer system, comprising primary computing component 101 and associated computing component 102, may, in combination, execute computer-readable instructions to perform the blocks in flowchart 1000. In reference to FIG. 5, blocks 1001-1011 correspond to steps 551-561.

Figure 11:
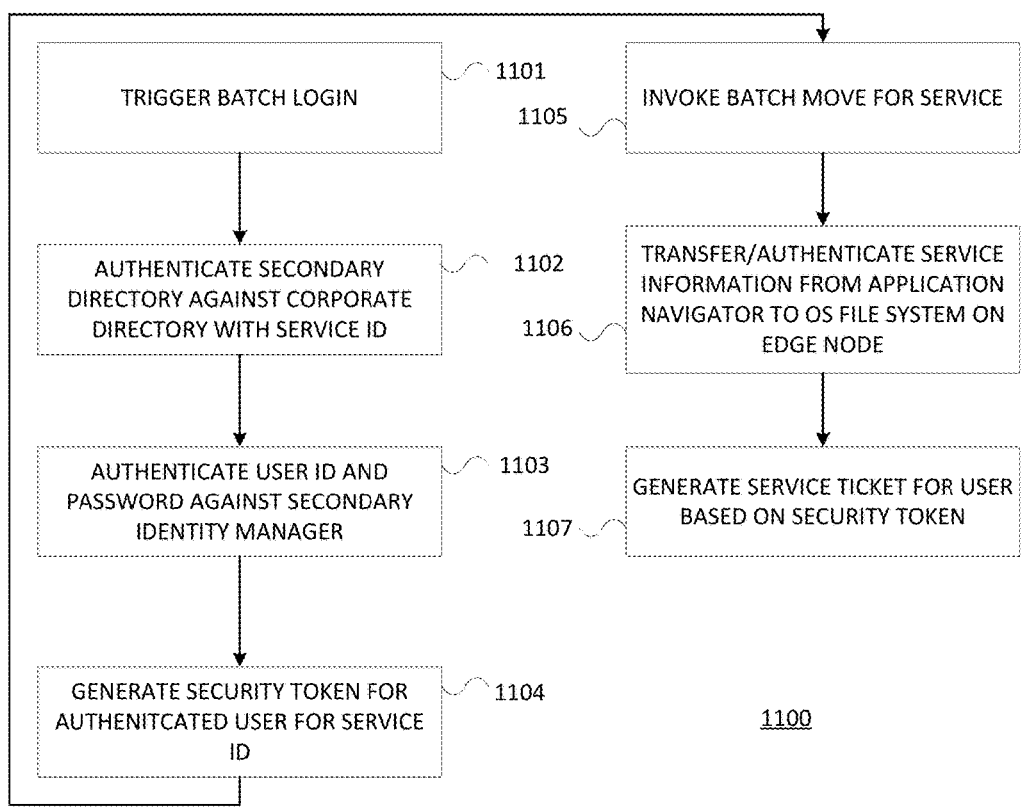
FIG. 11 shows a flowchart for batch process for enabling a user to obtain service by an application on an associated computing component in accordance with one or more example embodiments.

FIG. 11 shows flowchart 1100 for batch process that enables a user to obtain service by an application on associated computing component 102 in accordance with one or more example embodiments. Blocks 1101-1107 correspond to steps 651-657 as shown in FIG. 6.

A computer system, comprising primary computing component 101 and associated computing component 102, may, in combination, execute computer-readable instructions to perform the blocks in flowchart 1100.

FIGS. 12-15 show flowcharts corresponding to script that are executed at associated computing component 102 as previously discussed with FIG. 5.

Figure 12:
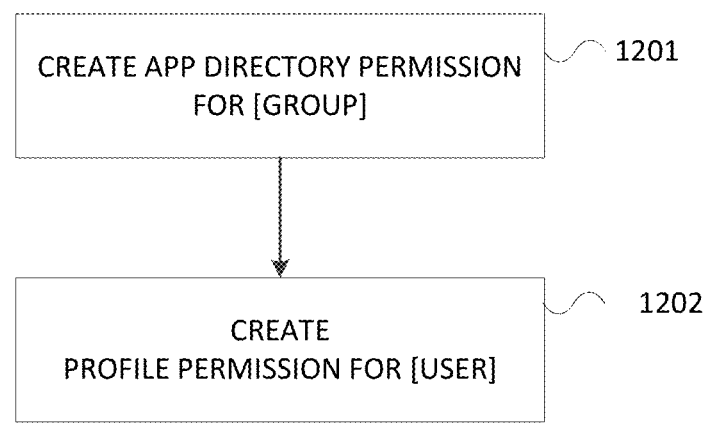
FIG. 12 shows a flowchart for setup script in accordance with one or more example embodiments.

FIG. 12 shows process 1200 for setup script in accordance with one or more example embodiments. Referring to FIG. 5, process 1200 corresponds to portions of steps 560 and 561.

At block 1201, process 1200 creates group permission for application directory 504. At block 1202, process 1200 creates user permission for user profile 503.

Figure 13:
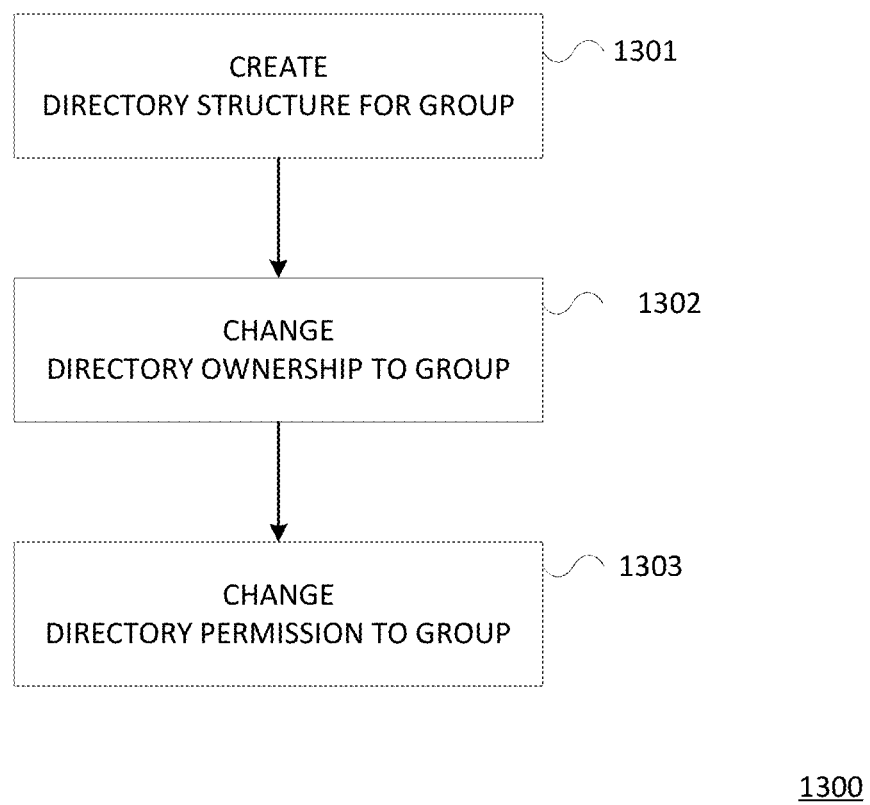
FIG. 13 shows a flowchart for creating application directory permission for a group in accordance with one or more example embodiments.

FIG. 13 shows process 1300 for creating application directory permission for a group in accordance with one or more example embodiments. Process 1300 expands on block 1201 as shown in FIG. 12.

At block 1301, process 1300 creates the directory structure of application directory 504 for the group. Process 1300 then changes directory ownership to the group at block 1302 and changes directory permission to the group at 1303.

Figure 14:
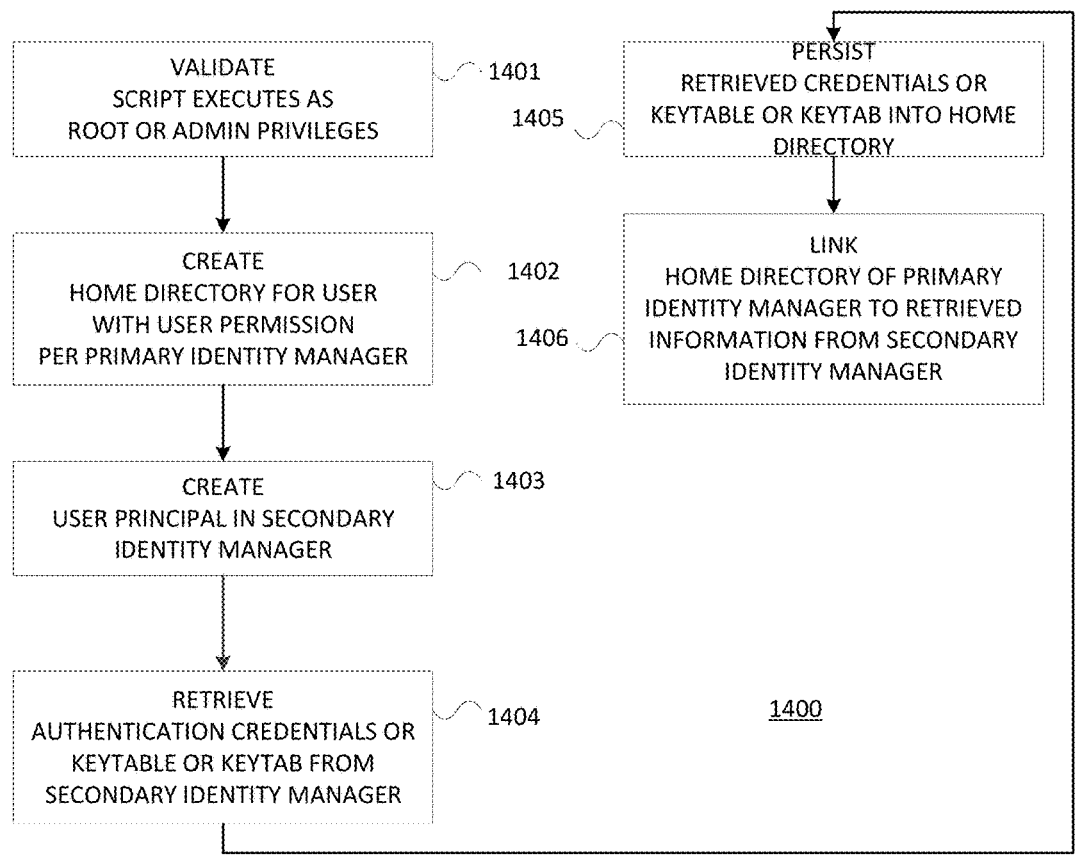
FIG. 14 shows a flowchart for creating profile permission for a user in accordance with one or more example embodiments.

FIG. 14 shows flowchart 1400 for creating profile permission for a user in accordance with one or more example embodiments.

Process 1400 validates that the script executes as root or administrative privileges at block 1401 and creates the home directory of the user with user permission in accordance with primary identity manager 104 at block 1402. With some embodiments, profile directory 503, as shown in FIG. 5, comprises the home directory.

Process 1400 then creates the user identification for secondary identity manager 108 at block 1403. Process 1400 retrieves authentication credentials from secondary manager 108 at block 1404 and establishes the retrieved credentials in the home directory at block 1405. At block 1406, process 1400 links the home directory to retrieved information from secondary identity manager 108.

Figure 15:
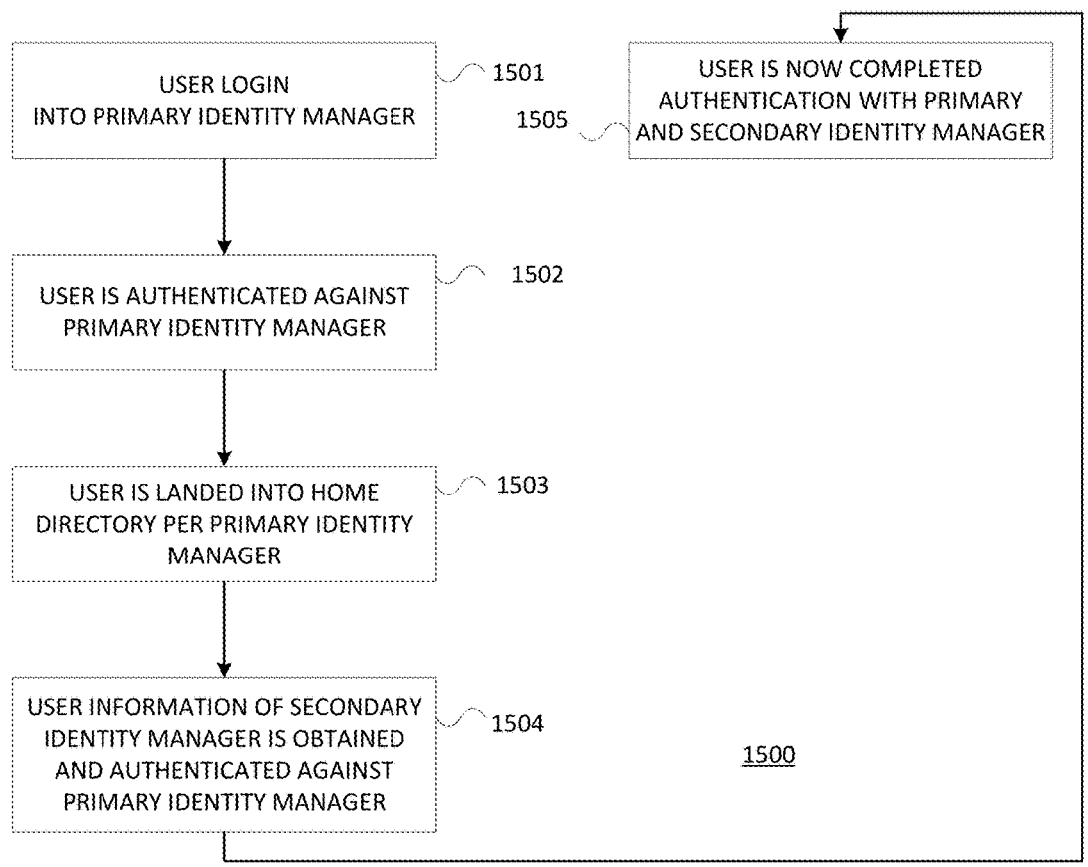
FIG. 15 shows a flowchart for login authentication creating in accordance with one or more example embodiments.

FIG. 15 shows flowchart 1500 for login authentication creating in accordance with one or more example embodiments. With some embodiments, process 1500 may be triggered by a user.

At block 1501, a user logins into primary computing component 101 through primary identity manager 104. Process 1500 then authenticates the user against primary identity manager 104 at block 1502 and the user is landed into the home directory per primary identity manager 104 at block 1503.

Process 1500 then obtains user information from secondary identity manager 108 and authenticates the obtained information against primary identity manager 104 at block 1504. Block 1505 completes authentication with primary identity manager 104 and secondary identity manager 108.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing apparatus, comprising:
a primary computing device comprising:
a primary identity manager, the primary identity manager authenticating a client computer based on a primary user identification and a primary password; and
a first associated computing device comprising:
a secondary identity manager; and
a first computing node that supports a first application,
wherein:
the first application may be accessed only from the first computing node by provisioned client computers;
when the client computer accesses the first computing node for the first application, the computing apparatus receives the primary user identification and the primary password for the client computer through the primary computing device;
in response to the accessing, a service initiation is triggered at the first associated computing device for first application;
the first associated computing platform authenticates the primary user identification with the primary computing device for the first application;
when the primary user identification is authenticated, the first associated computing device extracts a secondary password and the primary user identification from a user profile, the secondary password being different from the primary password; and
when the extracted secondary password is authenticated, the secondary identity manager issues and sends a security token to the client computer for the first application.

2. The computing apparatus of claim 1, wherein:
any user or group changes on the primary computing device are transparent to the first application supported by the first computing node.

3. The computing apparatus of claim 1, wherein:
when the client computer requests a service ticket for the first application by presenting the security token, the secondary identity manager interrogates the security token; and
when the interrogation is successful, the secondary identity manager issues and sends a service ticket to the client computer for the first application, the service ticket being valid during a specified time.

4. The computing apparatus of claim 3, wherein:
when the service ticket is presented by the client computer, the first computing node permits service for the first application only during the specified time.

5. The computing apparatus of claim 4, wherein the client computer accesses data in directories maintained at the primary computing device while obtaining service from the first computing node.

6. The computing apparatus of claim 4, wherein:
the first associated computing device further comprises a second computing node that supports a first application; and
when the service ticket is presented by the client computer, the second computing node permits service for a second application only during the specified time.

7. The computing apparatus of claim 1, wherein:
the client computer submits the primary user identification and the primary password to the primary computing device;
in response to the submitting, the first associated computing device receives a service request via the primary computing device;
the first associated computing device authenticates the primary user identification with the primary computing device for the first application;
when the primary user identification is authenticated, the first associated computing device extracts the secondary password and primary user identification from the user profile;
the first associated computing device authenticates the extracted secondary password with the secondary identity manager; and
when the extracted secondary password is authenticated, the secondary identity manager issues the security token to the client computer for the first application.

8. The computing apparatus of claim 1, further comprising:
a computer communication network that interconnects the primary computing component and the first associated computing component;
wherein:
the primary computing component receives a provisioning request for the first application to be provisioned for the client computer;
when the provisioning request is approved, the primary identity manager creates an application group for the first application with the client computer having the primary user identification;
the primary computing component instructs, through the computer communication network, the first associated computing component to create authentication information for the client computer, the authentication information comprising the primary user identification;
in response to the instructing, the secondary identity manager generates the secondary password for the client computer with the primary user identification, the secondary password being different from the primary password; and
the first computing node creates the user profile for the client computer with the primary user identification and the secondary password.

9. The computing apparatus of claim 8, wherein:
the primary computing component further comprises an application manager; and
the application manager receives a first application indicator indicative that the first application is selected from a plurality of applications.

10. The computing apparatus of claim 9, wherein:
when the application manager receives a second approval indicator indicative that the first application has been approved for the client computer, the application manager submits a group request that the primary user identification be added to the application group corresponding to the first application.

11. The computing apparatus of claim 9, wherein:
when the primary user identification has been added to the application group, the application manager initiates provisioning the first associated computing component for the client computer with the first application.

12. The computing apparatus of claim 1, wherein the service initiation is triggered at the first associated computing device as a batch process in accordance with a predetermined event.

13. The computing apparatus of claim 12, wherein the predetermined event comprises a predetermined time of day.

14. A method comprising:
   when a client computer accesses an associated computing device for an application, receiving a primary user identification and a primary password through a primary computing device;
   triggering a service initiation at the associated computing device for the application;
   authenticating, by a first associated computing device, the primary user identification with the primary computing device for the application;
   when the primary user identification is authenticated, extracting, by the associated computing device a secondary password and primary user identification from a user profile;
   authenticating, by the associated computing device, the extracted secondary password with a secondary identification manager;
   when the extracted secondary password is authenticated, issuing, by the associated computing device, a security token to the user for the application;
   authenticating, by the primary computing device, the client computer based on the primary user identification and the primary password;
   receiving, by the primary computing device, a provisioning request for the application to be provisioned for the client computer;
   when the provisioning request is approved, creating, by the primary computing device, an application group for the application with the client computer having the primary user identification;
   instructing, by the primary computing device, to create authentication information for the client computer, wherein the authentication information comprises the primary user identification;
   in response to the instructing, generating, by a first associated computing device, a secondary password for the client computer with the primary user identification, the secondary password being different from the primary password; and
   creating, by the first associated computing device, the user profile for the client computer with the primary user identification and the secondary password.

15. The method of claim 14 further comprising:
   when the client computer requests a service ticket for the application by presenting the security token, the secondary identification manager interrogates the security token;
   when the interrogation is successful, the secondary identification manager issues and sends a service ticket to the client computer for the application, the service ticket being valid during a specified time; and
   when the service ticket is presented by the client computer, a first computing node permits service for the application only during the specified time.

16. One or more non-transitory computer-readable media storing instructions that, when executed by a computing platform comprising at least one processor, memory, and a communication interface, cause the computing platform to:
   when a client computer accesses the computing platform for an application, receive a primary user identification and a primary password;
   trigger a service initiation for the application;
   authenticate the primary user identification for the application;
   when the primary user identification is authenticated, extract a secondary password and primary user identification from a user profile;
   authenticate the extracted secondary password;
   when the extracted secondary password is authenticated, issue a security token to a client device for the application;
   authenticating, by the primary computing device, the client computer based on the primary user identification and the primary password;
   receiving, by the primary computing device, a provisioning request for the application to be provisioned for the client computer;
   when the provisioning request is approved, creating, by the primary computing device, an application group for the application with the client computer having the primary user identification;
   instructing, by the primary computing device, to create authentication information for the client computer, wherein the authentication information comprises the primary user identification;
   in response to the instructing, generating, by a first associated computing device, a secondary password for the client computer with the primary user identification, the secondary password being different from the primary password; and
   creating, by the first associated computing device, the user profile for the client computer with the primary user identification and the secondary password.

* * * * *